(12) United States Patent
Miyahara et al.

(10) Patent No.: US 10,240,658 B2
(45) Date of Patent: Mar. 26, 2019

(54) TORSIONAL VIBRATION DAMPING DEVICE

(71) Applicant: TOYOTA JIDOSHA KABUSHIKI KAISHA, Toyota-shi (JP)

(72) Inventors: Yu Miyahara, Toyota (JP); Hiroyuki Amano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/108,752

(22) PCT Filed: Jan. 6, 2015

(86) PCT No.: PCT/JP2015/050149
§ 371 (c)(1),
(2) Date: Jun. 28, 2016

(87) PCT Pub. No.: WO2015/105099
PCT Pub. Date: Jul. 16, 2015

(65) Prior Publication Data
US 2016/0327118 A1 Nov. 10, 2016

(30) Foreign Application Priority Data

Jan. 8, 2014 (JP) .................................. 2014-001302

(51) Int. Cl.
*F16F 15/14* (2006.01)
*F16H 45/02* (2006.01)

(52) U.S. Cl.
CPC ............ *F16F 15/145* (2013.01); *F16H 45/02* (2013.01); *F16H 2045/0263* (2013.01)

(58) Field of Classification Search
CPC . F16F 15/145; F16H 45/02; F16H 2045/0263
See application file for complete search history.

(56) References Cited

U.S. PATENT DOCUMENTS 6,280,330 B1 * 8/2001 Eckel ................ F16F 15/13142
464/3
6,382,050 B1 * 5/2002 Carlson ................ F16F 15/145
464/24

(Continued)

FOREIGN PATENT DOCUMENTS

DE  10 2010 049 556 A1  5/2011
EP      2 607 743 A1  6/2013

(Continued)

OTHER PUBLICATIONS

International Search Report dated Feb. 10, 2015 for PCT/JP2015/050149 filed on Jan. 6, 2015.

*Primary Examiner* — Vicky A Johnson
(74) *Attorney, Agent, or Firm* — Oblon, McClelland, Maier & Neustadt, L.L.P.

(57) ABSTRACT

A vibration damping device that can prevent interference between a rolling mass and a cover resulting from deformation of the cover caused by pressure rise, and that can suppress noises is provided. The torsional vibration damping device comprises: a rotary member that is arranged in a torque converter; a rolling mass that is oscillated relatively to the rotary member by torque pulse; a bore that is formed on an outer circumferential portion of the rotary member in such a manner as to penetrates through the rotary member in a direction parallel to a rotational center axis; a cover that covers the rolling mass and the bore liquid-tightly to protect from oil in the torque converter; and a deformation-preventing member that prevents a deformation of the cover in a direction toward the rolling mass.

4 Claims, 5 Drawing Sheets

(56) References Cited

U.S. PATENT DOCUMENTS

| | | | |
|---|---|---|---|
| 9,518,631 B2 * | 12/2016 | Miyahara | F16F 15/145 |
| 2014/0066216 A1 * | 3/2014 | Tone | F16F 15/145 464/160 |
| 2014/0374207 A1 * | 12/2014 | Amano | F16F 15/145 192/3.28 |
| 2015/0005078 A1 * | 1/2015 | Sekiguchi | F16H 45/02 464/24 |

FOREIGN PATENT DOCUMENTS

| | | | | |
|---|---|---|---|---|
| EP | 3141775 A1 * | 3/2017 | | F16F 15/30 |
| JP | 06-193684 A | 7/1994 | | |
| JP | 2012-197886 A | 10/2012 | | |
| WO | 2013/128590 A1 | 9/2013 | | |
| WO | WO-2013161058 A1 * | 10/2013 | | F16H 45/02 |

\* cited by examiner

TORSIONAL VIBRATION DAMPING DEVICE

TECHNICAL FIELD

This invention relates to the art of a device for damping torsional vibrations utilizing reciprocating motion or oscillating motion of an inertial mass.

BACKGROUND ART

One example of this kind of device is described in Japanese Patent Laid-Open No. 2012-197886. In this device, a rolling mass is oscillated by torque pulses of a rotary member, and the vibrations of the rotary member are suppressed by an oscillating motion of the rolling mass. The device taught by Patent Laid-Open No. 2012-197886 is used in a torque converter. In order to protect the rolling mass and a raceway surface from oil, the rolling mass is held in a chamber closed liquid-tightly by a damper housing.

In order to ensure the oscillating motion of the rolling mass, the rolling mass is arranged in such a manner as not to be contacted to the damper housing. However, a hydraulic pressure in the torque converter is raised when the torque converter is rotated at a high speed. In addition, the hydraulic pressure in the torque converter is also raised when applying a lockup clutch. If the hydraulic pressure in the torque converter is raised excessively, the damper housing may be deformed and the rolling mass may be brought into contact to an inner face of the damper housing. Consequently, the rolling mass will not be allowed to oscillate freely and hence vibration damping performance becomes poor. In addition, the rolling mass and the damper housing may be worn and damaged.

DISCLOSURE OF THE INVENTION

The present invention has been conceived nothing the foregoing technical problems, and it is therefore an object of embodiments of the present invention is to provide a torsional vibration damping device in which deformations of a rolling mass and a cover are prevented to improve a vibration damping performance and to limit a damage.

An embodiment of the present application relates to a torsional vibration damping device, comprising: a rotary member that is arranged in a torque converter; a rolling mass that is oscillated relatively to the rotary member by torque pulse; a bore that is formed on an outer circumferential portion of the rotary member in such a manner as to penetrate through the rotary member in a direction parallel to a rotational center axis; and a cover that covers the rolling mass and the bore liquid-tightly to protect from oil in the torque converter. In order to achieve the above-explained objective, according to the preferred embodiment of the present invention, the torsional vibration damping device is provided with a deformation-preventing member that prevents a deformation of the cover in a direction toward the rolling mass.

The deformation-preventing member may include a rib that is formed on the cover to partially enhance stiffness of the cover.

The rib may be formed on an inner face of the cover at a position not to cause an interference with an oscillating motion of the rolling mass.

A plurality of the bores may be formed on the rotary member in a circular manner, and the rib may be formed between the bores. Optionally, the rib may comprise a buffer member that absorbs a collision impact between the rolling mass and a width end of the bore.

The deformation-preventing member may further include a brace member that prevents deformation of the cover caused by a load toward the rolling mass so as to prevent the rolling mass from being contacted to the cover.

The brace member may be arranged on at least any one of the inner face of the cover opposed to the outer circumferential portion of the rotary member, and a face of the rotary member opposed to the inner face of the cover.

As described, a plurality of the bores are formed on the rotary member in a circular manner, and the brace member may be formed between the bores. Optionally, the brace member may comprise a buffer member that absorbs a collision impact between the rolling mass and a width end of the bore.

Thus, according the preferred embodiment, the torsional vibration damping device is provided with the deformation-preventing member to prevent a deformation of the cover that has not been focused on the prior art. Since deformation of the cover is prevented by the deformation-preventing member even if an internal pressure of the torque converter is raised, the rolling mass is allowed to oscillate smoothly. For this reason, vibration damping performance can be improved while limiting frictional damage.

In the embodiment in which the rib is arranged to serve as the deformation-preventing member, the torsional vibration damping device can be manufactured without requiring additional parts. In addition, in the embodiment in which the rib is formed on the inner face of the cover, the rolling mass can be prevented from being contacted to the cover without elongating an axial length of the torsional vibration damping device.

In the embodiment in which the brace member is used to serve as the deformation-preventing member, the rolling mass can be prevented from being contacted to the cover without enhancing stiffness of the cover. In the embodiment in which the rib or brace member is provided with the buffer member, collision of the rolling mass against the width end of the bore can be prevented to suppress collision noise.

DESCRIPTION OF THE PREFERRED EMBODIMENT(S)

Figure 1:
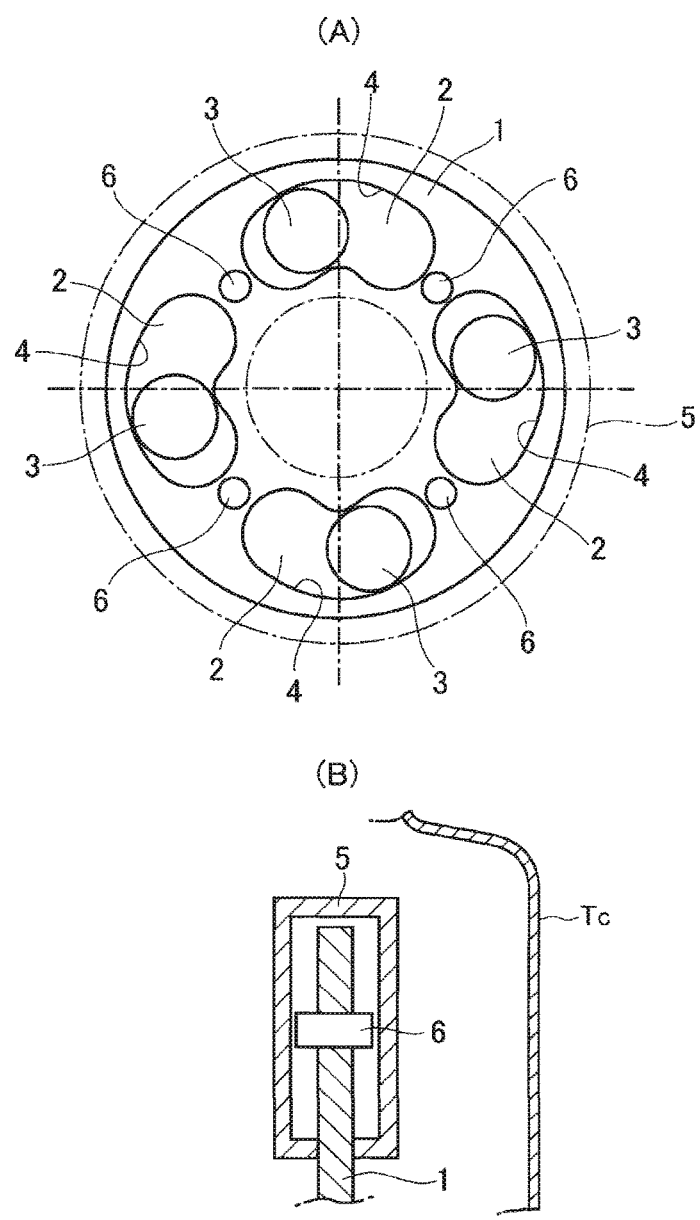
FIG. 1 (A) is a schematic front view showing the rotary member of the vibration damping device in which the cover is detached, and FIG. 1 (B) is a cross-sectional view of the cover.

A preferred embodiment of the present invention is schematically shown in FIG. 1. A rotary member (i.e., a plate) 1 is fitted onto another member to suppress torsional vibrations. A plurality of bores 2, specifically, four bores 2 are formed on an outer circumferential portion of the rotary member 1 in such a manner to penetrate through the rotary member 1 in a thickness direction (i.e., in a direction parallel to a rotational center axis). As depicted in FIG. 1, each bore 2 is individually shaped into a kidney shape whose curvature is larger than that of the outer circumference of the rotary member 1. A rolling mass 3 is individually held in each of the bore 2 in such a manner to be oscillated by an inertial force resulting from torque pulse of the rotary member 1. During rotation of the rotary member 1, each of the rolling mass 3 is pushed onto an inner surface (or an inner edge) as a raceway surface 4 and oscillated along the raceway surface 4. Specifically, a portion of the rolling mass 3 contacted to the raceway surface 4 is a column member having a circular cross-section, and optionally, the rolling mass 3 may be provided with a pair of flanges formed on both sides of the column member.

The rotary member 1 is arranged in a torque converter Tc. In order to protect the bore 2 and the rolling mass 3 from oil in the torque converter Tc thereby ensuring a smooth oscillation of the rolling mass 3, an outer circumferential portion of the rotary member 1 is covered by a cover 5. Specifically, as illustrated in FIG. 1, the cover 5 is a hollow annular member having a rectangular cross-section, and the bore 2 and the rolling member 3 are held in the hollow space of the cover 5.

A deformation-preventing member as a brace member 6 for preventing deformation of the cover 5 is arranged between the bores 2 in such a manner as not to hinder oscillating motion of the rolling mass 3. Specifically, a portion of the rotary member 1 between the bores 2 serves as a spoke, and the brace member 6 as a pin (or shaft) penetrates through the spoke of the rotary member 1 in the thickness direction. A length of the brace member 6 is longer than a thickness of the rolling mass 3, and the brace member 6 protrudes equally from both sides of the rotary member 1.

Although the torque converter Tc is filled with oil, the bore 2 and the rolling mass 3 are enclosed liquid-tightly by the cover 5. That is, the rolling mass 3 will not be contacted to the oil. When the rotary member 1 is rotated, the rolling mass 3 is centrifugally displaced away from a center of the rotary member 1 in the bore 2. In this situation, if a rotational speed of the rotary member 1 is changed by a change in torque applied to the rotary member 1, the rolling mass 3 is oscillated by an inertial force in the bore 2 along the raceway surface 4. Consequently, torsional vibrations are cancelled by the oscillating motion of the rolling mass 3 resulting from torque pulse of the rotary member 1.

Figure 2:
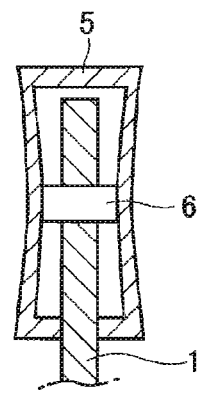
FIG. 2 is a partial cross-sectional view of the cover that is deformed by a hydraulic pressure.

When a hydraulic pressure in the torque converter Tc is raised by a centrifugal force resulting from an increase in a rotational speed of the torque converter Tc, or when the hydraulic pressure in the torque converter Tc is raised to apply a lockup clutch (not shown), the cover 5 is subjected to a compressive force. Consequently, as illustrated in FIG. 2, lateral faces of the cover 5 may be deformed inwardly. However, as explained, the brace member 6 having a longer length than the thickness of the rolling mass 3 is arranged in the cover 5 so that further deformation of the lateral face of the cover 5 can be prevented by the brace member 6. That is, a clearance between the lateral faces of the cover 5 will not be reduced to be narrower than the length of the brace member 6. For this reason, the rolling mass 3 can be prevented from being contacted to an inner face of the cover 5 to ensure a smooth oscillation of the rolling mass 3. In addition, the rolling mass 3 and the cover 5 can be prevented from being worn and damaged.

At least a surface of the brace member 6 may be formed of flexible material. For example, the brace member 6 may be formed of rubber material to serve as a buffer member. In this case, if the rolling mass 3 is provided with the flanges, the flanges of the rolling mass 3 come into contact to the buffer member at a width end of the bore 2 but a collision impact and noise may be absorbed by the buffer member.

Figure 3A:
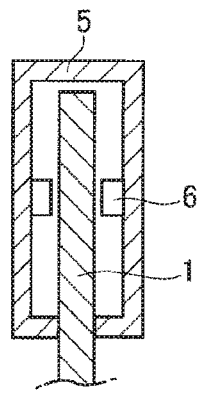
FIGS. 3 (A) to 3 (E) are cross-sectional views of the cover according to modification examples.
Figure 3B:
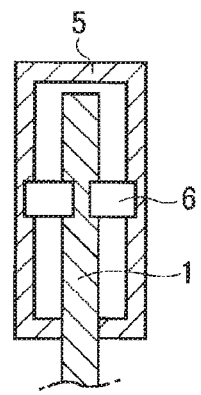

Modification embodiments of the present invention will be explained hereinafter. In the embodiment shown in FIG. 3A, the brace member 6 having the buffer member at least on its surface is attached to the inner face of the cover 5 instead of being inserted into the rotary member 1. As the foregoing embodiment, the brace member 6 is attached to the inner face of the cover 5 at a portion not to hinder the oscillating motion of the rolling mass 3. In the embodiment shown in FIG. 3B, the cover 5 is fixed to the rotary member 1 through the brace members 6.

Figure 3C:
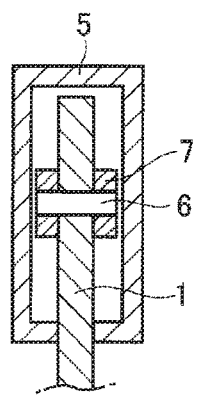
Figure 3D:
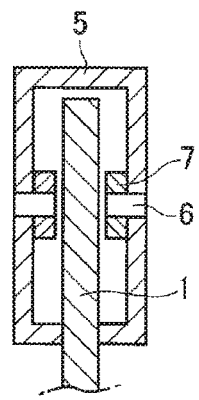
Figure 3E:
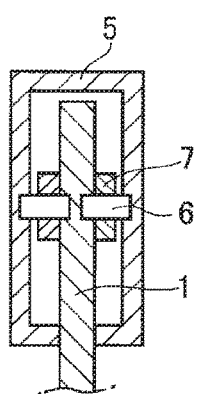

A separated buffer member may also be attached to the brace member 6. In the embodiment shown in FIG. 3C, the brace member 6 penetrates through the rotary member 1, and a buffer member 7 such as a rubber member is fitted onto each leading end of the brace member 6 (protruded from the rotary member 1). In the embodiment shown in FIG. 3D, the buffer member 7 is fitted onto each of the brace member 6 attached to the inner face of the cover 5. In the embodiment shown in FIG. 3E, an intermediate portion of each of the brace member 6 connecting the cover 5 to the rotary member 1 is covered by the buffer member 7.

In any of the embodiments shown in FIGS. 3A to 3E, vibration damping performance can be improved while limiting damages and suppressing noises. In other words, in the vibration damping device according to the preferred embodiment, it is not necessary to enhance strength or stiffness of the cover 5 and hence the cover 5 can be thinned to reduce a total weight of the vibration damping device. In addition, since the brace member 6 has a buffering function, the number of parts can be reduced to reduce the cost of vibration damping device.

Figure 4:
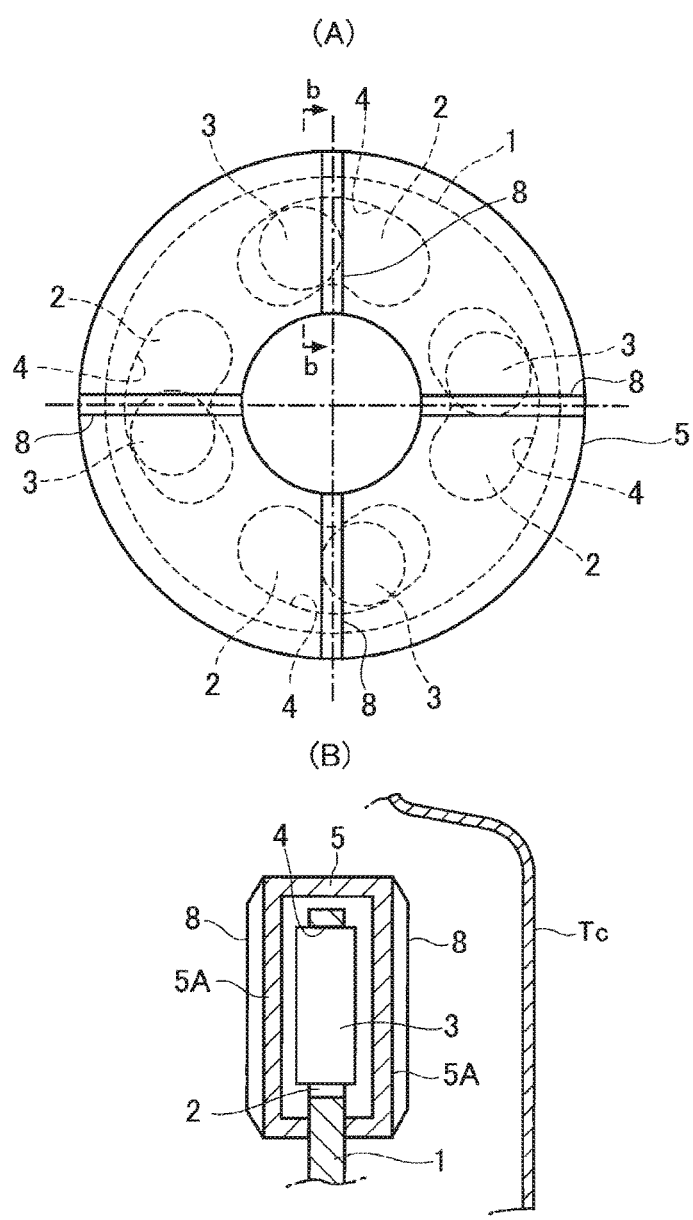
FIG. 4 (A) is a front view according to another embodiment of the present invention, and FIG. 4 (B) is a cross-sectional view along b-b line in FIG. 4 (A).

Here will be explained another embodiment of the present invention. According to another embodiment, deformation of the cover 5 is prevented by enhancing stiffness of the cover 5 so that the rolling mass 3 is allowed to oscillate without being contacted to the cover 5. In the embodiment shown in FIGS. 4 (A) and 4 (B), a rib 8 is formed on each outer face of the lateral face 5A (i.e., a flat lateral face perpendicular to the center axis) of the cover 5. Specifically, the rib 8 is formed by linearly increasing a thickness of the lateral face 5A of the cover 5, and in the embodiment shown in FIG. 4, a plurality of ribs 8 are formed radially on the lateral face 5A of the cover 5. It is to be noted that a configuration of the rib 8 may be altered arbitrarily. For example, the rib 8 may also be shaped into an annular shape concentrically with the lateral face 5A, a cross-shape, and so on.

Since the rib 8 is formed on the flat lateral face 5A of the cover 5, a second moment of area of the lateral face 5A is partially increased by the rib 8 so that bending strength of the cover 5 can be enhanced. In this case, therefore, the lateral face 5A will not be deformed by the external pressure to the extent that the lateral face 5A is brought into contact to rolling mass 3. In other words, configuration of the rib 8 may be determined in such a manner as to achieve a desired second moment of area of the lateral face 5A possible to prevent the lateral face 5A from being deformed to be brought into contact to the rolling mass 3 by the expected external pressure. According to another embodiment shown in FIG. 4, therefore, the rolling mass 3 is allowed to oscillate smoothly as the forgoing embodiments to improve vibration damping performance. In addition, friction and wearing can be suppressed to limit damage.

Figure 5:
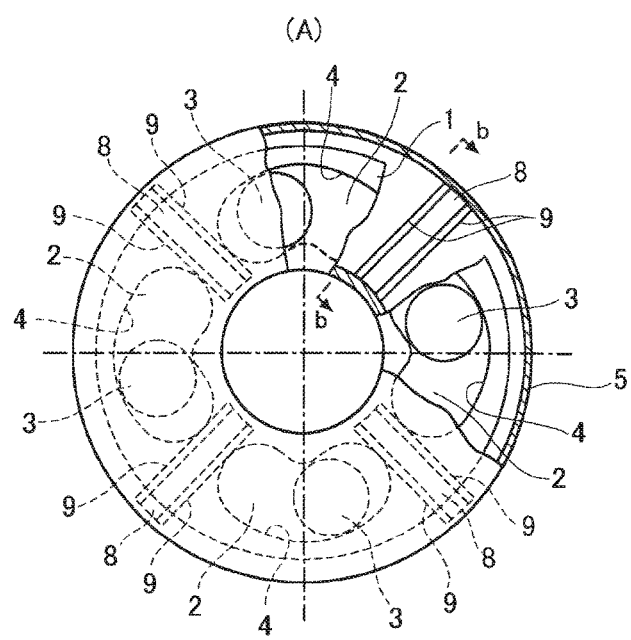
FIG. 5 (A) is a front view of the rotary member according to still another embodiment in which the cover is partially omitted, and FIG. 5 (B) is a cross-sectional view along b-b line in FIG. 5 (A).
Figure 5:
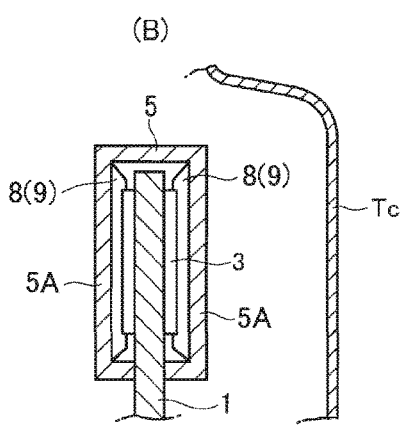

In the embodiment shown in FIGS. 5 (A) and 5 (B), the ribs 8 are formed on an inner face of the lateral face 5A to protrude inwardly. In this embodiment, the ribs 8 are formed at positions not to cause an interference with an oscillating motion of the rolling mass 3. Since the oscillating motion of the rolling mass 3 is restricted within the bore 2 and bores 2 are formed while keeping a predetermined interval therebetween, an outer circumference of the rolling mass 3 will not reach the spoke of the rotary member 1 between the bores 2. In this embodiment, therefore, each of the rib 8 is formed radially on the inner face of the lateral face 5A between the bores 2. Here, a height of the rib 8 (i.e., a protruding length from the inner face of the lateral face 5A) may be determined arbitrarily. That is, the height of the rib 8 may be set in such a manner as not only to bring the rib 8 into contact to the rotary member 1 but also to maintain a predetermined clearance between the rotary member 1 and the rib 8. In case the rib 8 is contacted to the rotary member 1, as the foregoing embodiments, the rib 8 may also serve as the above-explained brace member 6 for preventing deformation of the cover 5 caused by a deformation load.

According to the embodiment shown in FIG. 5, the bending strength of the cover 5 is enhanced by the ribs 8. In this case, therefore, the lateral face 5A also will not be deformed by the external pressure to the extent that the lateral face 5A is brought into contact to rolling mass 3. In other words, configuration of the rib 8 may also be determined in such a manner as to achieve a desired second moment of area of the lateral face 5A possible to prevent the lateral face 5A from being deformed to be brought into contact to the rolling mass 3 by the expected external pressure. According to the embodiment shown in FIG. 5, therefore, the rolling mass 3 is allowed to oscillate smoothly as the forgoing embodiments to improve vibration damping performance. In addition, friction and wearing can be suppressed to limit damage. Further, since protrusions are not formed on an outer face of the lateral face 5A, the outer dimension of the vibration damping device will not be expanded especially in the axial direction so that the torque converter Tc may be downsized.

In the embodiment in which the rib 8 is formed between the bores 2, the rolling mass 3 oscillates toward and away from the rib 8. However, the rolling mass 3 collides against the width end corners of the bore 2 during oscillation. In order to suppress collision noise, a buffer member 9 may be attached to the rib 8 to absorb a collision impact of the rolling mass 3. For example, the buffer member 9 may be shaped into a sheet member formed of flexible material to cover a surface of the rib 8. Alternatively, the rib 8 may also be formed of flexible material such as synthetic resin. Optionally, the buffer member may protrude into the bore 2 to stop the oscillating rolling mass 3 before colliding against the width end of the bore 2. If the rolling mass 3 is provided with flanges on both sides to have an "H" shaped cross-section, the buffer member 9 may be formed within a clearance between the bores 2. By thus arranging the buffer member 9 on the rib 8 formed on the inner face of the lateral face 5A, the cover 5 can be prevented from being deformed by the external pressure to allow the rolling member to oscillate without being contacted to the cover 5. In addition, noises resulting from collision of the rolling mass 3 against the width end of the bore 2 can be suppressed.

The present invention should not be limited to the foregoing embodiments. For example, configurations, locations, numbers of the brace members and the ribs serving as the deformation-preventing member may be altered according to need within the scope of the present invention.

The invention claimed is:

1. A torsional vibration damping device, comprising:
a rotary member;
a plurality of rolling masses that are oscillated relatively to the rotary member by torque pulse;
a bore formed on an outer circumferential portion of the rotary members to penetrate through the rotary member in a direction parallel to a rotational center axis;
a cover as a hollow annular member having a rectangular cross-section, that covers the outer circumferential portion of the rotary member to hold the rolling masses and bores liquid-tightly; and
a deformation-preventing member that prevents a deformation of the cover in a direction toward the rolling mass, the deformation-preventing member including a plurality of ribs extending from an inner lateral face of the cover perpendicular to the rotational center axis at positions in a circumferential direction of the rotary member between the bores,
wherein the bores are formed on the rotary member in a circular manner,
wherein the deformation-preventing member is arranged between the bores, and prevents the rolling masses from contacting the cover, and
wherein each of the ribs are formed respectively between the bores at a position not to cause an interference with an oscillating motion of the rolling masses.

2. The torsional vibration damping device as claimed in claim 1,
wherein the ribs partially enhance stiffness of the cover.

3. The torsional vibration damping device as claimed in claim 1,
wherein the ribs comprise a buffer member that absorbs a collision impact between the rolling masses and a width end of the bores.

4. The torsional vibration damping device as claimed in claim 1, wherein a height of the rib is set such that the rib is brought into contact to the rotary member when the cover is deformed.

* * * * *